3,002,852
METHOD OF FORMING TANTALUM SILICIDES ON TANTALUM SURFACES
Melvin G. Bowman and Nerses H. Krikorian, Los Alamos, N. Mex., assignors to the United States of America as represented by the United States Atomic Energy Commission
No Drawing. Filed July 18, 1960, Ser. No. 43,697
2 Claims. (Cl. 117—106)

The present invention teaches methods for forming protective coatings on tantalum surfaces, coatings which resist corrosion by liquid plutonium and liquid plutonium alloys used as nuclear reactor fuels, and more specifically teaches a method of forming such a coating composed of tantalum silicides.

In the nuclear fission reactor art, attempts to use as the active fuel liquid plutonium or liquid plutonium containing one or more fluxing or diluent additives such as iron or cerium have been plagued by the container problem. Ordinary materials such as steel are unsuitable because plutonium alloys readily with iron; even the more expensive stainless steels are unsuitable because of this alloying. Of the less common refractory metals, tantalum appears to be the best container material. Early experience with tantalum indicated relatively little reaction when both the container and the fuel were heated to a uniform temperature throughout. More realistic tests in which thermal gradients were present revealed a mass transfer type of corrosion which takes two forms, uniform solution attack and intergranular penetration. In the former, container material is dissolved from the hotter regions and is plated out in the cooler regions because of the lower solubility of tantalum in the fuel at the lower temperatures. In the intergranular type of mass transfer, the fuel corrodes away the container material along its grain boundaries. The occurrence or nonoccurrence of intergranular penetration can not be predicted, as it is observed in some specimens while others, apparently identical, are not attacked under identical conditions. When it does occur, such attack is highly irregular, as corrosion takes place along some grain boundaries without occurring along adjacent grain boundaries. The phenomenon is not clearly understood, and may or may not be related to minor traces of impurities present in the tantalum.

It is therefore the object of the present invention to furnish a method for preventing corrosive attack by plutonium and its alloys on tantalum containers.

A more specific object of the present invention is to furnish a method of forming a coating on such tantalum containers, a coating which is adherent, stable in the liquid range of plutonium and plutonium alloy fuels, nonreactive with such fuels, and sufficiently impervious to prevent reaction between such fuels and such tantalum containers.

The coating material found to have such properties according to the present invention is one or more tantalum silicides, including the various species $TaSi_3$, $TaSi_2$, $TaSi$, $Ta_5Si_3$, $Ta_2Si$ and $Ta_{4.5}Si$.

In attempting to form such coatings, it was quickly discovered that, at low temperatures, below the melting point of silicon, the reaction between tantalum and silicon to form one or more tantalum silicides is too slow to be feasible. In the silicon liquidus range of temperatures, coating by immersion was also found to be impractical, as the reaction can not be controlled to provide a uniform coating or to prevent caking of elemental silicon. While it may be possible to promote the reaction by confining the tantalum object in an atmosphere of silicon vapor, it would be extremely difficult to control the thickness of the coating in the surface area to which it is applied.

The method of the present invention consists basically in dissociating a silicide which is less stable than the tantalum silicides by heating the less stable silicide in contact with the tantalum object. One such silicide, the preferred intermediate of the present invention, is a silicide of rhenium, $Re_3Si$. This silicide may be formed in various ways, most simply by mixing the pelletized powders of the two elements in the $Re_3Si$ stoichiometric ratio and heating them in a graphite resistance furnace at about 1600° C. for about 90 minutes. The cooled furnace slug may be arc melted and ground to a powder for a powder for the purposes of the present invention.

The $Re_3Si$ powder is then placed inside a tantalum tube and heated under vacuum to about 1700° C. Between about 1450° C. and 1725° C. the silicide dissociates as follows:

$$Re_3Si(s) = 3Re(s) + Si(g)$$

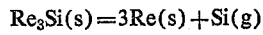

The silicon gas then combines with the tantalum of the tube to form a variety of silicides, probably increasing in tantalum richness with depth, as follows: $TaSi_3$, $TaSi_2$, $TaSi$, $Ta_5Si_3$, $Ta_2Si$ and $Ta_{4.5}Si$.

As a specific example, 8 grams of arc-melted powdered $Re_3Si$ were placed in a tantalum tube 0.375" O.D. by 0.345" I.D. by 0.601" high. This filled tube was surrounded by an eddy current concentrator having a cavity of 0.625" diameter and 0.75" long, and was heated to about 1750° C. for 30 minutes in an induction furnace under a vacuum of about $1 \times 10^{-4}$ mm. Hg.

One such specimen has been analyzed and found to have a silicide coating of 10 microns thickness which contained $Ta_2Si$, $TaSi_2$ and a third, unidentified silicide.

The upper temperature limit for the reaction is determined by the melting point of $Re_3Si$, slightly above 1750° C. Above such melting point, the solutions formed are unknown, and there may be binary solutions of Re and $Re_3Si$, Re and Ta, intermetallic compounds of the three metals and ternary solutions containing the three metals. Furthermore, a liquid-solid reaction would introduce difficulties in physically separating the rhenium silicide from the wall of the crucible.

A somewhat larger specimen, a crucible of about ½ inch O.D., was coated by the above process, using 30 grams of powdered $Re_3Si$ which had not undergone the arc-melting purification step. The crucible weighed 4.9257 g. prior to coating and 4.9512 g. after one hour in the furnace at 1700° C. and a pressure of $1 \times 10^{-4}$ mm. Hg. The tantalum silicide coating was adherent and uniform, with a thickness of 10–15 microns. This crucible was tested by filling it with plutonium and heating it above the melting point of the plutonium, and was found to provide the desired barrier action, i.e., it adhered well, did not react with fuel or container, and prevented corrosion of the container by the fuel.

In coating such crucible, the powdered trirhenium silicide was simply loaded into the crucible cavity. The nascent silicon vapor liberated in the dissociation apparently diffuses easily through the reactant powder and the rhenium product, the latter showing no tendency to agglomerate. There was no tendency for the mixed powders ($Re_3Si$ and Re) to stick to the coating, the excess material taking the form of an easily removable sintered cylinder. If desired, however, both the reactant silicide and the rhenium product can be isolated from the tantalum surface to be coated, as by suspending the reactant powder in an inner container of tantalum gauze.

It is possible to use an inert gas atomsphere rather than the vacuum employed, e.g., one or more of the noble gases. The disadvantage of using such a gas is that the mean free path of the gaseous silicon particles is reduced, thus contributing to non-uniform reaction.

As indicated in the first example above, heating of the reactants at 1750° C. for 30 minutes resulted in a 10 micron coating thickness. Such thickness has been found to be imminently suitable for the intended purposes of the coating as it prevent both a uniform solution attack and intergranular penetration. It should, however, be regarded as somewhat close to the maximum, as major thicknesses up to 20 microns have been shown to result in spalling which may expose areas of the tantalum substrate. Smaller thicknesses down to 2 microns have not exhibited such spalling and continue to resist corrosive attack. In preparing such coatings by the method outlined above, it is apparent that the thickness may be easily controlled by adjusting the reaction temperature and the time at which it is held at such temperature.

What is claimed is:

1. The process of coating a tantalum surface with a coating of tantalum silicides consisting essentially of heating trirhenium silicide under vacuum in contact with said tantalum surface to a temperature sufficient to dissociate said trirhenium silicide into its elemental components, said temperature being less than the melting point of said trirhenium silicide.

2. The process of claim 1 in which said temperature lies between about 1400° C. and 1750° C.

References Cited in the file of this patent

UNITED STATES PATENTS 2,512,455 Alexander _____ June 20, 1950
2,771,666 Campbell et al. _____ Nov. 22, 1956

OTHER REFERENCES

Chemical Abstracts, vol. 51, page 4260, 1957.

Constitution of Binary Alloys, Hanson, page 1151, McGraw-Hill, published 1958.

"The Silicides of Rhenium" 1–3, vol. 75, Alan W. Searcy and Robert A. McNees, Jr., American Chemical Society Journal, pp. 1578–1580.